(12) United States Patent
Strong

(10) Patent No.: US 11,694,354 B2
(45) Date of Patent: Jul. 4, 2023

(54) GEOSPATIAL OBJECT GEOMETRY EXTRACTION FROM IMAGERY

(71) Applicant: Pictometry International Corp., Rochester, NY (US)

(72) Inventor: Shadrian Strong, Bellevue, WA (US)

(73) Assignee: Pictometry International Corp., Rochester, NY (US)

(*) Notice: Subject to any disclaimer, the term of this patent is extended or adjusted under 35 U.S.C. 154(b) by 302 days.

(21) Appl. No.: 17/072,627

(22) Filed: Oct. 16, 2020

(65) Prior Publication Data

US 2021/0118165 A1    Apr. 22, 2021

Related U.S. Application Data

(60) Provisional application No. 62/923,200, filed on Oct. 18, 2019.

(51) Int. Cl.
*G06T 7/00* (2017.01)
*G06T 7/60* (2017.01)
(Continued)

(52) U.S. Cl.
CPC .............. *G06T 7/60* (2013.01); *G06T 7/13* (2017.01); *G06T 7/194* (2017.01); *G06T 11/203* (2013.01);
(Continued)

(58) Field of Classification Search
CPC .. G06T 7/60; G06T 7/13; G06T 7/194; G06T 11/203; G06T 2207/10032;
(Continued)

(56) References Cited

U.S. PATENT DOCUMENTS

| 5,633,995 A | 5/1997 | McClain |
| 5,983,010 A | 11/1999 | Murdock et al. |

(Continued)

FOREIGN PATENT DOCUMENTS

| GB | 2554361 A | 4/2018 |
| JP | 2016103759 A | 6/2016 |

(Continued)

OTHER PUBLICATIONS

Zhuo ("Optimization of OpenStreetMap Building Footprints Based on Semantic Information of Oblique UAV Images", Remote Sensing, vol. 10, No. 4, Apr. 18, 2018 (Apr. 18, 2018), p. 624, XP055756807, DOI: 10.3390/rs10040624) (Year: 2018).*

(Continued)

*Primary Examiner* — Ping Y Hsieh
(74) *Attorney, Agent, or Firm* — Dunlap Codding, P.C.

(57) ABSTRACT

Apparatuses, systems, methods, and medium are disclosed for precise geospatial structure geometry extraction from multi-view imagery, including a non-transitory computer readable medium storing computer executable code that when executed by a processor cause the processor to: receive an image of a structure having an outline, the image having pixels with first pixel values depicting the structure and second pixel values outside of the structure depicting a background of a geographic area surrounding the structure, and image metadata including first geolocation data; and generate a synthetic shape image of the structure from the image using a machine learning algorithm, the synthetic shape image including pixels having pixel values forming a synthetic shape of the outline, the synthetic shape image having second geolocation data derived from the first geolocation data.

17 Claims, 10 Drawing Sheets

(51) Int. Cl.
G06T 7/194 (2017.01)
G06T 7/13 (2017.01)
G06T 11/20 (2006.01)

(52) U.S. Cl.
CPC .............. G06T 2207/10032 (2013.01); G06T 2207/20081 (2013.01); G06T 2207/20084 (2013.01); G06T 2207/30184 (2013.01)

(58) Field of Classification Search
CPC . G06T 2207/20081; G06T 2207/20084; G06T 2207/30184; G06T 7/11
See application file for complete search history.

(56) References Cited

U.S. PATENT DOCUMENTS

| | | |
|---|---|---|
| 7,440,586 B2 | 10/2008 | Avidan |
| 8,462,992 B2 | 6/2013 | Chen et al. |
| 9,396,583 B2 | 7/2016 | Barthelet et al. |
| 9,547,908 B1 | 1/2017 | Kim et al. |
| 9,805,261 B1 | 10/2017 | Loveland et al. |
| 9,864,901 B2 | 1/2018 | Chang |
| 10,102,584 B1 | 10/2018 | Devereaux et al. |
| 10,977,490 B1 | 4/2021 | Bokshi-Drotar et al. |
| 2009/0067725 A1 | 3/2009 | Sasakawa et al. |
| 2013/0155109 A1 | 6/2013 | Schultz et al. |
| 2015/0117784 A1 | 4/2015 | Lin et al. |
| 2015/0227808 A1 | 8/2015 | Zharkov |
| 2016/0005097 A1 | 1/2016 | Hsiao et al. |
| 2016/0027051 A1 | 1/2016 | Gross |
| 2016/0217537 A1 | 7/2016 | Childs |
| 2016/0239956 A1 | 8/2016 | Kang et al. |
| 2016/0259994 A1 | 9/2016 | Ravindran et al. |
| 2016/0371801 A1 | 12/2016 | Dawson |
| 2017/0091627 A1 | 3/2017 | Terrazas et al. |
| 2017/0206648 A1* | 7/2017 | Marra ..................... G01C 11/00 |
| 2017/0308549 A1 | 10/2017 | Sims et al. |
| 2017/0352100 A1 | 12/2017 | Shreve et al. |
| 2018/0075168 A1* | 3/2018 | Tiwari .................. G06T 3/0068 |
| 2018/0089531 A1 | 3/2018 | Geva et al. |
| 2018/0089833 A1 | 3/2018 | Lewis et al. |
| 2019/0065907 A1 | 2/2019 | Strong et al. |
| 2019/0155973 A1 | 5/2019 | Morczinek et al. |
| 2019/0271550 A1 | 9/2019 | Breed et al. |
| 2020/0019825 A1 | 1/2020 | Frei et al. |
| 2020/0348132 A1 | 11/2020 | Du et al. |
| 2021/0158609 A1 | 5/2021 | Raskob et al. |

FOREIGN PATENT DOCUMENTS

| | | |
|---|---|---|
| JP | WO 2006/120724 | 11/2016 |
| WO | WO2006040775 A2 | 4/2006 |

OTHER PUBLICATIONS

Shi ("Building Footprint Generation Using Improved Generative Adversarial Networks", arxiv.org, Cornell University Library, 201 Olin Library Cornell University Ithaca, NY 14853,Oct. 26, 2018 (Oct. 26, 2018), XP081198321, DOI: 10.1109/LGRS.2018. 2878486) (Year: 2018).*

Galarreta et al., "UAV-based Urban Structural Damage Assessment Using Object-based Image Analysis and Semantic Reasoning," Nat. Hazards Earth Syst. Sci., 15, 1087-1101; Copernicus Publications; 2015.

Galarreta, Jorge Fernandez; "Urban Structural Damage Assessment Using Object-Oriented Analysis and Semantic Reasoning," Thesis submitted to the Faculty of Geo-Information Science and Earth Observation of the University of Twente; Enschede, The Netherlands, Apr. 2014.

Kang et al., "Building Instance Classification Using Street View Images," ISPRS Journal of Photogrammetry and Remote Sensing, 145, 44-59, Elsevier, Mar. 2018.

USPTO, Advisory Action regarding U.S. Appl. No. 15/634,879, dated Jan. 19, 2022.

Omniearth, Inc., Response dated Jan. 19, 2022 Advisory Action and dated Sep. 14, 2021 Office Action regarding U.S. Appl. No. 15/634,879, filed Feb. 14, 2022.

European Patent Office acting as the International Searching Authority; Search Report and Written Opinion regarding PCT/US2020/056019, dated Dec. 22, 2020.

Zhuo et al., "Optimization of OpenStreetMap Building Footprints Based on Semantic Information of Oblique UAV Images", Remote Sensing, vol. 10, No. 4, Apr. 18, 2018.

Shi et al., "Building Footprint Generation Using Improved Generative Adversarial Networks," ARXIV.org, Cornell University Library, 201 Olin Library Cornell University Ithaca, NY 14853; Oct. 26, 2018.

Roddick et al., "Orthographic Feature Transform for Monocular 3D Object Detection", ARXIV.org, Cornell University Library, 201 Olin Library Cornell University Ithaca, NY 14853; Nov. 20, 2018.

ESRI, Getting Started with ArcGIS, 2005, available at: <http://downloads.esri.com/support/documentation/ao_/1003Getting_Started_with_ArcGIS.pdf>, downloaded on Sep. 1, 2019 (Year: 2005).

Holt, Alec, "Spatial similarity and GIS: the grouping of spatial kinds," 1999, available at: < https://pdfs.semanticscholar.org/1 ff7/49c905db58bb884a9d6609de9452edf7921 b.pdf >, downloaded on Sep. 1, 2019 (Year: 1999).

Artificial Neural Networks Technology, [online], archived on Nov. 23, 2015, available at:<https://web.archlve.org/web/20151123211404/http://www2.psych.utoronto.ca/users/relngold/course> (Year: 2015).

Marr, Bernard, "A Short History of Machine Learning—Every Manager Should Read," [online], Feb. 19, 2016, available at: < https://www.forbes.com/sltes/bernardmarr/2016/02/19/a-short-history-of-machine-learning-every-manager-should-read/#70f07e5415e7 > (Year: 2016).

Tong, et al., "Salient Object Detection via Bootstrap Learning", Computer Vision Foundation, 2015.

USPTO, Notice of Allowance for U.S. Appl. No. 15/634,879, dated Mar. 17, 2022.

USPTO, Office Action regarding U.S. Appl. No. 16/893,090, dated Dec. 6, 2022.

* cited by examiner

GEOSPATIAL OBJECT GEOMETRY EXTRACTION FROM IMAGERY

CROSS-REFERENCE TO RELATED APPLICATIONS

This application claims priority to the provisional patent application identified by U.S. Ser. No. 62/923,200, filed Oct. 18, 2019, titled "GEOSPATIAL OBJECT GEOMETRY EXTRACTION FROM IMAGERY", the entire content of which is hereby expressly incorporated herein by reference.

BACKGROUND

A multitude of processes dealing with structure analysis must include determining the precise bounds of an object, such as a structure, within imagery. From identifying new portions of the structure or classifying segments of the structure to isolating the structure within an image for further image analysis, quickly and precisely determining the bounds of the structure within an image ultimately affects the precision and accuracy of further measurements and analysis of the structure. A manual process exists whereby an individual reviews each image and marks, on the image, the structure geometry. This process, however, is slow and time consuming. Additionally, due to the need for the individual to review each of the images, it is very costly.

What is needed is a system to determine structure geometry from imagery in which the process is not as time consuming or as expensive as the manual process, but is more accurate and provides more information about a structure than general image observations. It is to such an improved system to determine structure geometry from imagery that the present disclosure is directed.

SUMMARY

Being able to determine precise geospatial structure geometry from images in a scalable manner is a significant improvement upon the current state of the art. The problem of determining structure geometry from imagery is solved with the systems described herein. In general, the present disclosure describes a system, method, or non-transitory computer readable medium in which a processor receives an image of a structure having an outline. The image has pixels with first pixel values depicting the structure and second pixel values outside of the structure depicting a background of a geographic area surrounding the structure, and image metadata including first geolocation data. A synthetic shape image of the structure is generated from the image using a machine learning algorithm. The synthetic shape image includes pixels having pixel values forming a synthetic shape of the outline. The synthetic shape image has second geolocation data derived from the first geolocation data.

In some embodiments, the machine learning algorithm is a first machine learning algorithm that is a component of a generator of a generative adversarial network. The generative adversarial network may also include a discriminator having a second machine learning algorithm. The generator may receive the image of the structure and generate the synthetic shape image. The generative adversarial network may be trained with truth pairs with each truth pair including a truth image and a truth shape image. In some embodiments, the truth image and the truth shape image have a same pixel resolution. In some embodiments, the truth image includes third geolocation data and the truth shape image includes fourth geolocation data, the fourth geolocation data being derived from the third geolocation data.

BRIEF DESCRIPTION OF SEVERAL VIEWS OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
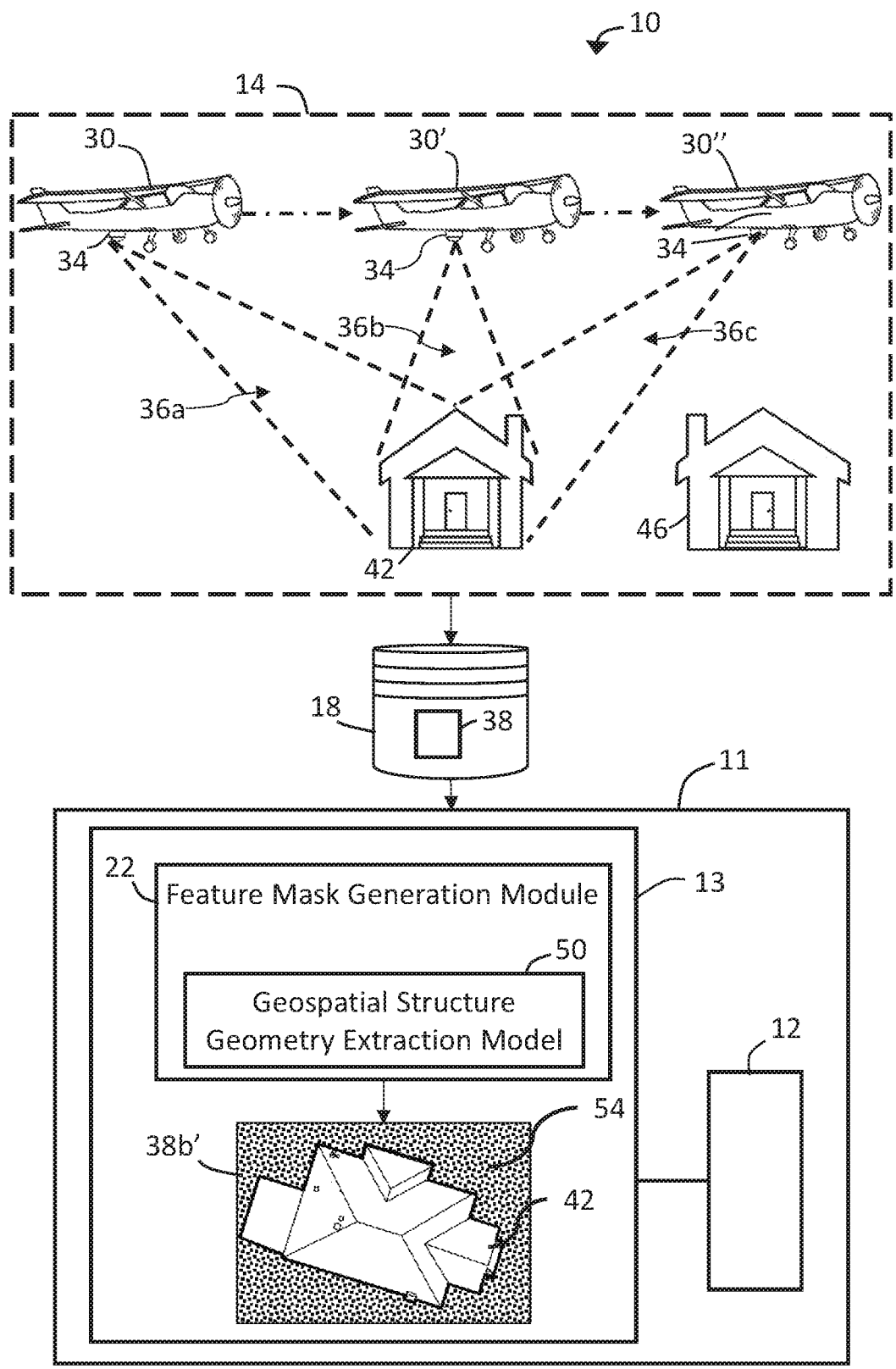
FIG. 1 is a diagram of an exemplary embodiment of an image collection system in accordance with the present disclosure.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. For instance, the methods and systems may be used to assess an outline of an object in an image depicting the object. Although the object will be described herein with respect to a structure, such as a building, it should be understood that the object could be other types of objects, such as man-made objects, or natural objects. Non-exclusive examples of man-made objects include other types of buildings such as industrial buildings, or commercial buildings. Also, it is to be understood that the phraseology and terminology employed herein is for purposes of description, and should not be regarded as limiting.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". For example, a condition A or B is satisfied by one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, use of the term "plurality" is meant to convey "more than one" unless expressly stated to the contrary.

As used herein, qualifiers like "substantially," "about," "approximately," and combinations and variations thereof, are intended to include not only the exact amount or value that they qualify, but also some slight deviations therefrom, which may be due to computing tolerances, computing error, manufacturing tolerances, measurement error, wear and tear, stresses exerted on various parts, and combinations thereof, for example.

As used herein, any reference to "one embodiment," "an embodiment," "some embodiments," "one example," "for example," or "an example" means that a particular element, feature, structure or characteristic described in connection with the embodiment is included in at least one embodiment and may be used in conjunction with other embodiments. The appearance of the phrase "in some embodiments" or "one example" in various places in the specification is not necessarily all referring to the same embodiment, for example.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Software includes one or more computer readable instructions, also referred to as executable code, that when executed by one or more components cause the component to perform a specified function. It should be understood that the algorithms described herein may be stored on one or more non-transitory computer readable medium.

Exemplary non-transitory computer readable mediums may include random access memory, read only memory, flash memory, and/or the like. Such non-transitory computer readable mediums may be electrically based, magnetically based, optically based, and/or the like. Non-transitory computer readable medium may be referred to herein as non-transitory memory.

Digital images can be described as pixelated arrays of electronic signals. The array may include three dimensions. Such an array may include spatial (x, y or latitude, longitude) and spectral (e.g. red, green, blue) elements. Each pixel in the image captures wavelengths of light incident on the pixel, limited by the spectral bandpass of the system. The wavelengths of light are converted into digital signals readable by a computer as float or integer values. How much signal exists per pixel depends, for example, on the lighting conditions (light reflection or scattering), what is being imaged, and even the imaged object's chemical properties.

Machine Learning (ML) is generally the scientific study of algorithms and statistical models that computer systems use in order to perform a specific task effectively without using explicit instructions, relying on patterns and inference instead. It is considered a subset of artificial intelligence (AI). Machine learning algorithms build a mathematical model based on sample data, known as "training data", in order to make predictions or decisions without being explicitly programmed to perform the task. Machine learning algorithms may be used in applications, such as digital imagery analysis, where it is infeasible to develop an algorithm of specific instructions for performing one or more task. Machine Learning algorithms are commonly in the form of an artificial neural network (ANN), also called a neural network (NN). A neural network "learns" to perform tasks by considering examples, generally without being programmed with any task-specific rules. The examples used to teach a neural network may be in the form of truth pairings comprising a test input object and a truth value that represents the true result from the test input object analysis. When a neural network has multiple layers between the input and the output layers, it may be referred to as a deep neural network (DNN).

For machine learning with digital imagery, a computer system may be trained to deconstruct digital images into clusters of aggregated pixels and statistically identify correlations in the clusters. The correlations are iteratively evaluated and "learned" from by the computer system, based on a directive to classify a set of patterns as a specific thing. For example, the directive could be to classify the set of patterns to distinguish between a cat and dog, identify all the cars, find the damage on the roof of a building, and so on. The utilization of neural networks in machine learning is known as deep learning.

Over many imaged objects, regardless of color, orientation, or size of the object in the digital image, these specific patterns for the object are mostly consistent—in effect they describe the fundamental structure of the object of interest. For an example in which the object is a cat, the computer system comes to recognize a cat in an image because the system understands the variation in species, color, size, and orientation of cats after seeing many images or instances of cats. The learned statistical correlations are then applied to new data to extract the relevant objects of interest or information.

Convolutional neural networks (CNN) are machine learning models that may be used to perform this function through the interconnection of equations that aggregate the pixel digital numbers using specific combinations of connections of the equations and clustering the pixels, in order to statistically identify objects (or "classes") in a digital image. Exemplary uses of Convolutional Neural Networks are explained, for example, in "ImageNet Classification with Deep Convolutional Neural Networks," by Krizhevsky et al. (Advances in Neural Information Processing Systems 25, pages 1097-1105, 2012); and in "Fully Convolutional Networks for Semantic Segmentation," by Long et al. (IEEE Conference on Computer Vision and Pattern Recognition, June 2015.

Generative adversarial networks (GANs) are neural network deep learning architectures comprising two neural networks and pitting one against the other. One neural network, called a Generator, generates new data instances, while another neural network, called a Discriminator, evaluates the new data instances for authenticity, that is, the Discriminator decides whether each data instance belongs to the training data set or not. The creation of a generative adversarial network is explained, for example, in "Generative Adversarial Networks," by Goodfellow, et al. (Departement d'informatique et de recherche operationnelle Universite de Montreal, June 2014).

When using computer-based supervised deep learning techniques, such as with a CNN, for digital images, a user provides a series of examples of digital images of the objects of interest to the computer and the computer system uses a network of equations to "learn" significant correlations for the object of interest via statistical iterations of pixel clustering, filtering, and convolving.

The artificial intelligence/neural network output is a similar type model, but with greater adaptability to both identify context and respond to changes in imagery parameters. It is typically a binary output, formatted and dictated by the language/format of the network used, that may then be implemented in a separate workflow and applied for predictive classification to the broader area of interest. The relationships between the layers of the neural network, such as that described in the binary output, may be referred to as the neural network model or the machine learning model.

In the technological field of remote sensing, digital images may be used for mapping geospatial information. Classifying pixels in an image for geospatial information purposes has been done through various techniques. For example, some CNN-based techniques include Semantic Segmentation (also known as pixel-wise classification or individual pixel mapping) using fully convolutional neural networks (FCN) as described in "Fully Convolutional Networks for Semantic Segmentation," by Long et al., referenced above. In this technique, each pixel in the image is given a label or classification based on training data examples, as discussed in the general overview above. However, the technique is computationally intensive, as it requires resources of computational space, time, and money to assess each individual pixel.

A technique that exists outside of the technological field of geospatial mapping is General Image Classification using a convolutional neural network (CNN), such as that described by Simonyan et al. in the article "Very Deep Convolutional Networks for Large-Scale Image Recognition" (International Conference on Machine Learning, 2015). In General Image Classification, rather than individual pixels being labeled, an entire image is given a generalized label. This is typically a much simpler algorithm than the FCN Semantic Segmentation, and so may require less computation. However, this method provides less information about an image, as it is limited to the image as an aggregated whole as a generalization rather than identifying particulars, such as where objects in the scene are located within the digital image or where particular information is located within the digital image.

Structure geometry is defined as a structure's extent or the structure's shape. The structure geometry may include any porches, carports, utility areas, or garages that are attached to the structure. The structure geometry may also include any other structure or feature attached to the structure, such as a gazebo or pergola, for example.

Described below are examples of a fully automated machine learning solution for geospatial structure geometry extraction from imagery, in a quantifiable manner.

Referring now to the drawings, FIG. 1 is a diagram of an exemplary embodiment of a geospatial structure geometry extraction system 10. The geospatial structure geometry extraction system 10 may comprise a computer system 11 comprising one or more computer processors 12 and one or more non-transitory computer readable medium 13 (which may be referred to as non-transitory memory 13) storing a feature mask generation module 22 and at least one mask image 38$b'$. The geospatial structure geometry extraction system 10 may further comprise an image capture system 14 and/or at least one image database 18. In one embodiment, the image capture system 14 and the feature mask generation module 22 operate substantially simultaneously, while in another embodiment, the image capture system 14 operates prior to and/or independent of the feature mask generation module 22.

Figure 2:
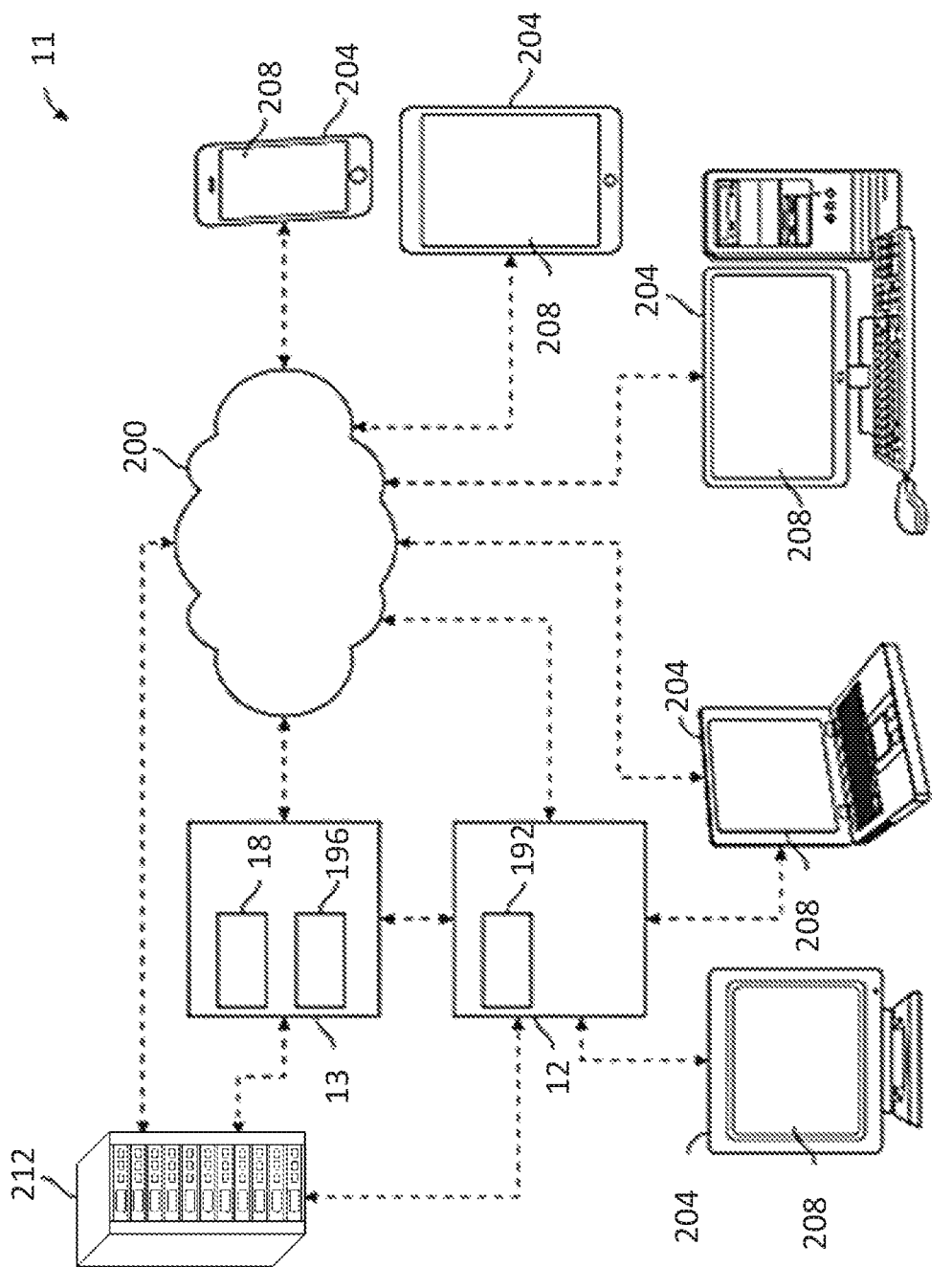
FIG. 2 is an exemplary embodiment of a computer system in accordance with the present disclosure.

In one embodiment, as shown in FIG. 2, the computer system 11 may comprise one or more communication component 192. The one or more non-transitory memory 13 may store the image database 18 and a training database 196. The image database 18 and the training database 196 may be separate databases, or may be integrated into a single database. The computer system 11 may include a network 200 enabling bidirectional communication between the computer processor 12 and the non-transitory memory 13 with a plurality of user devices 204. The user devices 204 may communicate via the network 200 and/or may display information on a screen 208. The computer processor 12 or multiple computer processors 12 may or may not necessarily be located in a single physical location.

In one embodiment, the network 200 is the Internet and the user devices 204 interface with the computer processor 12 via the communication component 192 using a series of web pages. It should be noted, however, that the network 200 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, an Ethernet network, combinations thereof, and/or the like.

In one embodiment, the one or more computer processor 12 and the one or more non-transitory memory 13 may be implemented with a server system 212 having multiple servers in a configuration suitable to provide a commercial computer-based business system such as a commercial website and/or data center.

In some implementations, the feature mask generation module 22 is implemented as software (also known as executable code) that is stored on the one or more non-transitory memory 13 and that, when executed by the one or more computer processors 12, cause the one or more computer processors 12 to carry out one or more actions. In some implementations, the feature mask generation module 22 may change the functionality of the one or more computer processors 12.

Returning now to FIG. 1, in one embodiment, the image capture system 14 may comprise one or more capture platform 30 and one or more camera 34 connected to, attached to, within, and/or integrated with the capture platform 30. The camera 34 may capture one or more digital images 38 of an exterior of a structure 42 at one or more positions at one or more instances of time with one or more camera 34. The digital images 38 have pixels.

For explanatory purposes, FIG. 1 shows the capture platform 30 at a first position at a first instance in time capturing with the camera 34 a first oblique digital image 38 using a first field of view 36a, as well as the capture platform 30 at a second position as capture platform 30' capturing with the camera 34 a nadir digital image 38a of the structure 42 using a second field of view 36b at a second instance in time, and the capture platform 30 as capture platform 30" at a third position capturing with the camera 34 a second oblique digital image 38b of the structure 42 using a third field of view 36c at a third instance in time. Though the digital images 38 are described in this example as two oblique images 38 and one nadir image 38, other combinations of oblique and/or nadir images may be utilized.

In some implementations, the one or more camera 34 of the capture platform 30 may capture digital images 38 of more than one structure 42 at one time. For instance, the structure 42 may be a first structure 42 and the capture platform 30' at the second instance in time may capture the first nadir digital image 38 of the first structure 42 while also capturing a first oblique image 38 of a second structure 46, and/or a single image 38 may depict both the first structure 42 and the second structure 46 within the single image 38.

Once the digital images 38 are captured, the digital images 38 may be stored in the captured image database 18. The captured image database 18 may be stored separately from or as part of, one or both of the image capture system 14 and the feature mask generation module 22. The captured image database 18 may be stored in the one or more non-transitory memory 13.

For purposes of the examples described herein, the images 38 depicting the structure 42 will be described. It should be understood, however, that the images 38 may show many structures of various types, shapes, and geometries, each of which may be analyzed to generate the mask image 38b' as discussed herein.

In one embodiment, the capture platform 30 comprises a manned aircraft and/or an unmanned aircraft. In some embodiments, the capture platform 26 may comprise one or more vehicle, either manned or unmanned, aerial based or ground based. Exemplary vehicles include an aircraft, an airplane, a helicopter, a drone, a car, a boat, or a satellite. In some embodiments, the image capture system 14 may be carried by a person. For example, the image capture system 14 may be implemented as a portable telephone and/or a portable computer system (such as a computer tablet).

In one embodiment, the one or more camera 34 can be oriented and located in various orientations and locations, such as street view, satellite, automotive based, unmanned aerial vehicle based, and/or manned aerial vehicle based.

The image data may contain nominal "visible-band" (red, green, blue) wavelength spectral data or other spectral bands data (for example, infrared wavelength spectral data). The images 38 can be captured independently at different instances of time, or at least some of the images 38 can be captured simultaneously using multiple cameras 34.

In some implementations, the images 38 can be captured through the use of a global shutter in which all of the sensors within the camera 34 are exposed simultaneously, a rolling shutter in which different scanlines in the sensor are exposed at different times, or combinations thereof. In one embodiment, one or more of the images 38 can be a synthetic global shutter image created from a rolling shutter image, or combinations thereof. An exemplary synthetic global shutter image is disclosed in the patent application identified by U.S. patent application Ser. No. 16/343,610 (Pub. No. US2020/0059601A1), entitled "An Image Synthesis System", which is a national stage filing of PCT/AU2017/051143, both of which are hereby incorporated in their entirety herein.

In one embodiment, the images 38 have or are correlated with geolocation data indicating the location, orientation, and camera parameters of a camera at the precise moment each image 38 is captured. The geolocation data can be stored as metadata. Exemplary metadata includes X, Y and Z information (e.g., latitude, longitude and altitude; or other geographic grid coordinates); time; orientation such as pitch, roll, and yaw; camera parameters such as focal length and sensor size; and correction factors such as error due to calibrated focal length, sensor size, radial distortion, principal point offset, and alignment.

The images 38 may be geo-referenced, that is, processed such that pixels in the image 38 have a determined geo-location, such as X, Y, and Z coordinates and/or latitude, longitude, and elevation/altitude coordinates. The determined geo-location, such as X, Y, and Z coordinates and/or latitude, longitude, and elevation/altitude coordinates may be included within the metadata. In some implementations, the images 38 may be georeferenced using the techniques described in U.S. Pat. No. 7,424,133, and/or U.S. patent application Ser. No. 16/343,610 (Pub. No. US2020/0059601A1), the entire contents of each of which are hereby incorporated herein by reference. The metadata can be stored within the images 38 or stored separately from the images 38 and related to the images 38 using any suitable technique, such as unique identifiers.

In one embodiment, each of the images 38 may have a unique image identifier such as by use of metadata, or otherwise stored in such a way that allows the computer system 11 to definitively identify each of the images 38.

Figure 3A:
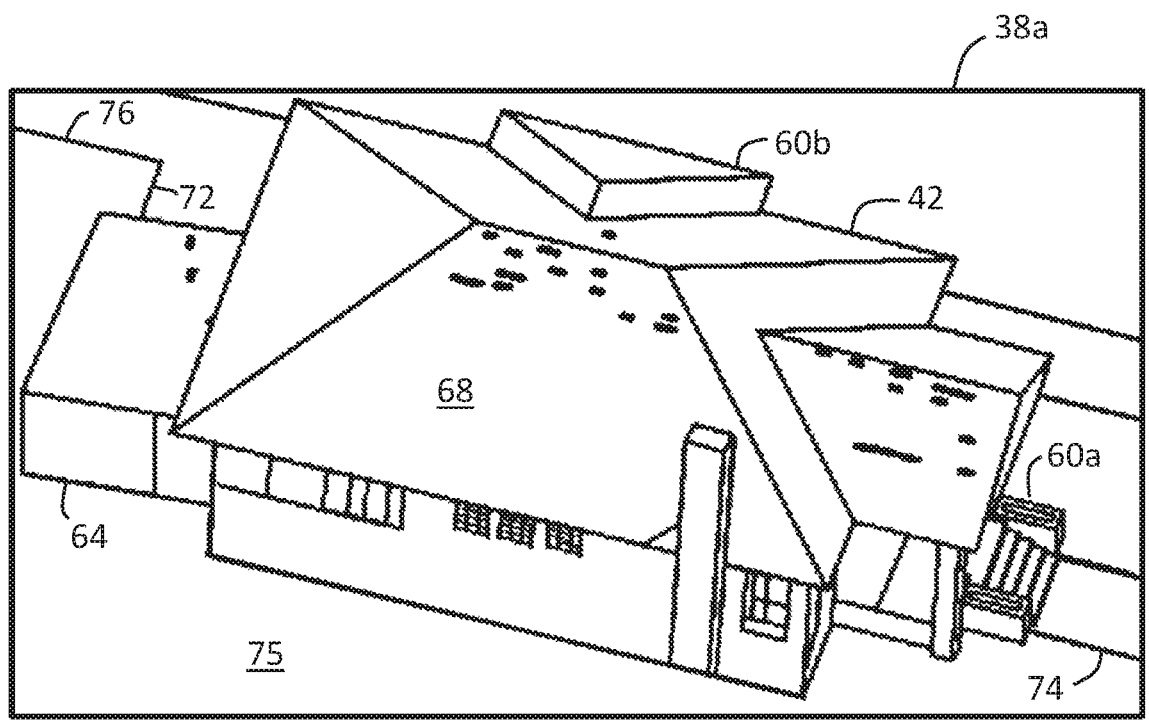
FIG. 3A is an exemplary oblique image depicting a structure.
Figure 3B:
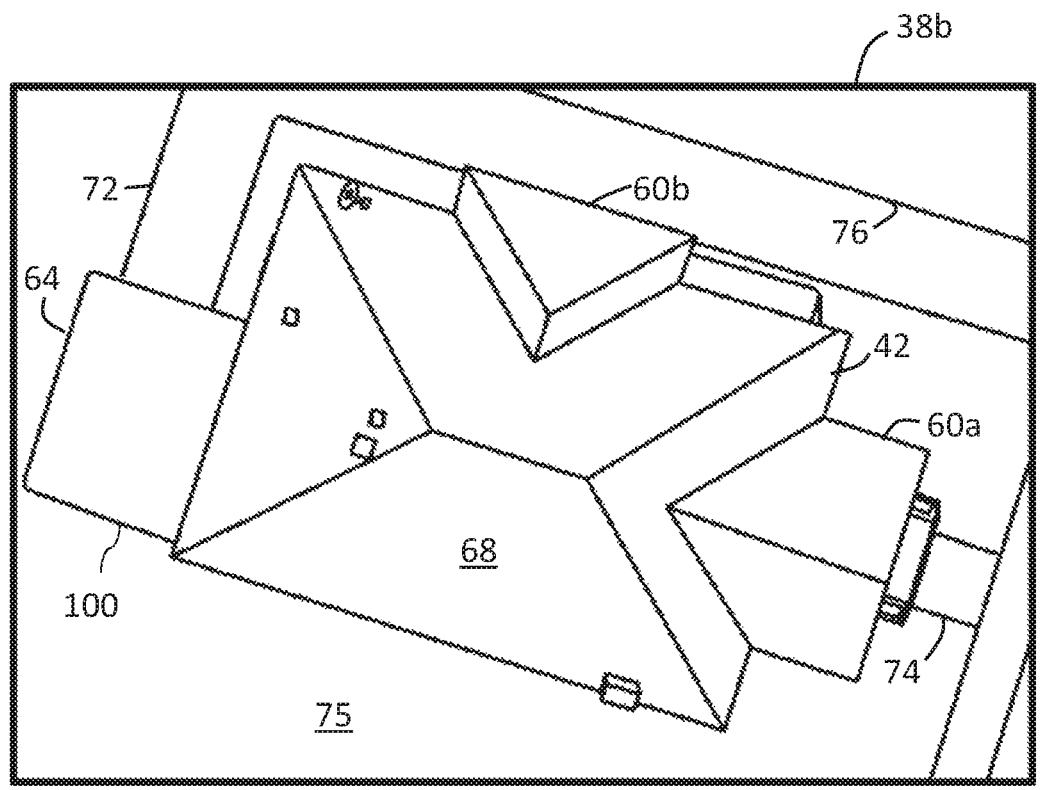
FIG. 3B is an exemplary nadir image depicting the structure of FIG. 3A.

In the example shown in FIGS. 3A and 3B, the images 38a and 38b of the structure 42 are both from an aerial perspective. The image 38a is from an oblique perspective which is typically within a range from about 10 degrees to 75 degrees from a nadir perspective, and more preferably within a range from about 40 degrees to 50 degrees from the nadir perspective. The image 38b is captured from an overhead viewpoint, also referred to as an ortho view or nadir view (as seen in the second field of view 36b in FIG. 1, for example), typically taken directly below and/or vertically downward from the camera lens positioned above the structure 42, as shown in the resulting image 38b shown in FIG. 3B. An aerial oblique view (as seen in the first field of view 36a and third field of view 36c in FIG. 1, for example) may be taken from approximately 10 degrees to 75 degrees from a nadir direction, as shown in the resulting image 38a depicted in FIG. 3A. In one embodiment, certain of the images 38 may be nadir, and some of the images 38 may be captured from an oblique perspective. In some embodiments, some of the images 38 can be captured from different oblique angles. For example, a first one of the images 38 may be an aerial nadir image, a second one of the images 38 may be an aerial oblique image taken from approximately 10 degrees from the nadir direction, and a third one of the images 38 may be an aerial oblique image taken from approximately 20 degrees from the nadir direction.

Exemplary image capture components that can be used to capture the images 38 are disclosed in U.S. Pat. Nos. 7,424,133, 8,385,672, and U.S. Patent Application Publication No. 2017/0244880, the entire contents of all of which are hereby incorporated herein by reference.

In one embodiment, a particular structure, such as the structure 42 may be selected for analysis. The selection of the structure 42 may be performed by a user or by the one or more computer processor 12. The selection of the structure 42 by the one or more computer processor 12 may be performed in a stand-alone operation or may be performed by the one or more computer processor 12 accessing a database of structures lacking geospatial structure geometry information and selecting a structure from the database to process. In one embodiment, the structure 42 is a dwelling, or house, while in other embodiments, the structure 42 is a commercial building. Selection of the structure 42 can be indirect, such as when a particular geographic region is selected. When a particular geographic region is selected, then the processes described herein can be applied to each of the structures depicted within the images 38 showing at least a portion of the geographic region, such as by use of geo-location data and/or georeferencing of pixels in the images 38. Locations of particular structures depicted within the images 38 can be determined using a geo-coding database.

Figure 6:
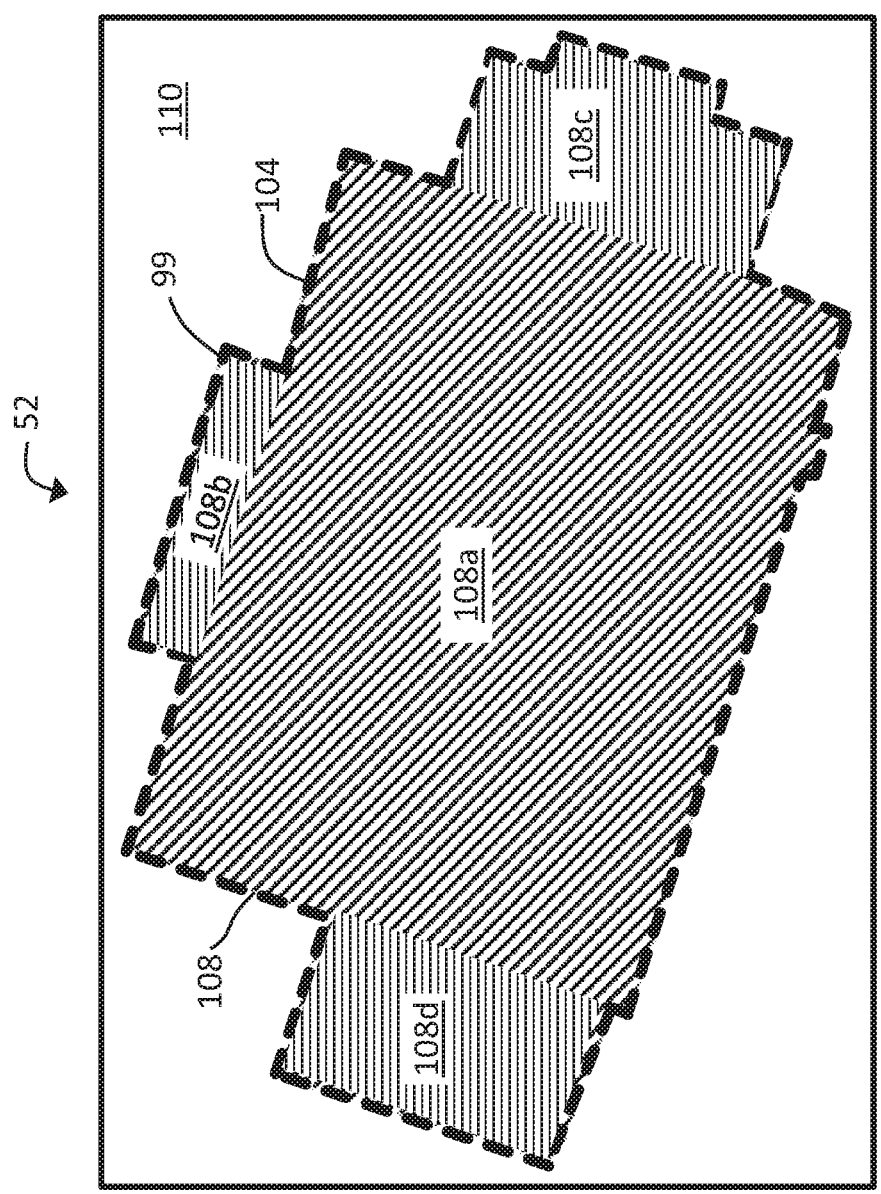
FIG. 6 is an exemplary embodiment of a synthetic structure of the structure of FIGS. 2A and 2B.

The one or more computer processor 12 may execute the feature mask generation module 22 which causes the one or more computer processors 12 to receive or select the image 38 of the structure 42, such as from the image database 18. The feature mask generation module 22 then analyzes the image 38, utilizing the geospatial structure geometry extraction model 50 (discussed below in relation to FIG. 4), to extract precise geospatial structure geometry for the structure 42 forming a synthetic shape 99 (an example of which is shown in FIG. 6) which may be the outline of the structure 42.

The feature mask generation module 22 may then use the synthetic shape 99 to generate the mask image 38b' by aligning the synthetic shape 99 of the structure 42 on the image 38 depicting the structure 42, and then masking off the pixels outside of the synthetic shape 99. The mask image 38b' depicts the structure 42 and surrounding areas 54. In some embodiments the mask image 38b' only shows real world captured pixels of the structure 42. In this embodiment, the pixel values in the surrounding areas 54 are changed to predetermined or varying pixel value(s) that do not represent the real world captured pixels of the background surrounding the structure 42 in the image 38. For example, the pixels of the background may be changed to a solid color or shaded.

In one embodiment the image database 18 is integrated with the feature mask generation module 22. However, the image database 18 may also be integrated into the image capture system 14 or may be separate from both the image capture system 14 and the feature mask generation module 22. In some embodiments, one or more of the image capture system 14, the image database 18, and the feature mask generation module 22 are integrated with each other and/or are integrated within a parent system further having components and/or modules that perform manipulations of the synthetic shape 99.

Referring now to FIG. 3A, shown therein is an exemplary embodiment of the image 38a depicting the structure 42 from an oblique perspective. In this example, the structure 42 has a first porch 60a, a second porch 60b, a garage 64, and a roof 68. The image 38a also depicts a background of the structure 42, including a driveway 72, sidewalk 74, a lawn 75, and a road 76.

While only the first porch 60a, the second porch 60b, the garage 64, the roof 68 and the driveway 72 are shown in image 38a, it is understood that other structures may have further identifiable features such as, but not limited to, a pergola, a deck, and that other objects in addition to the structure 42 may be depicted in the image 38a such as, but not limited to the driveway 72, the sidewalk 74, the lawn 75, and a road 76. Further, other background including a pool, vegetation, a pond, or other natural feature may also be depicted.

Referring now to FIG. 3B, shown therein is an exemplary embodiment of the image 38b depicting the structure 42 from an orthogonal, or nadir, perspective. The image 38b also depicts the structure 42 having the first porch 60a, the second porch 60b, the garage 64, and the roof 68. The background including the driveway 72, the sidewalk 74, the lawn 75, and the road 76 are also shown. Other background including a pool, vegetation, a pond or other natural feature may also be depicted.

Other objects may also be depicted in the images 38a and 38b such as vegetation, including but not limited to shrubbery, tall grass, trees, bushes, and flowers, geographic features, including but not limited to hills, cliffs, ponds, lakes, and rivers, and other human-made structures, including but not limited to sheds, pools, gardens, driveways, roads, bridges, sidewalks, and towers. It is understood that the drawings are limited to two images 38a and 38b of the structure 42 for simplicity, however, the number of images 38 of the structure 42 may exceed two.

The images 38a and the image 38b are shown as aerial images by way of example. It should be understood that the images 38a and 38b may be captured in other manners. Additionally, the images 38a and 38b may be captured at different times.

Figure 4:
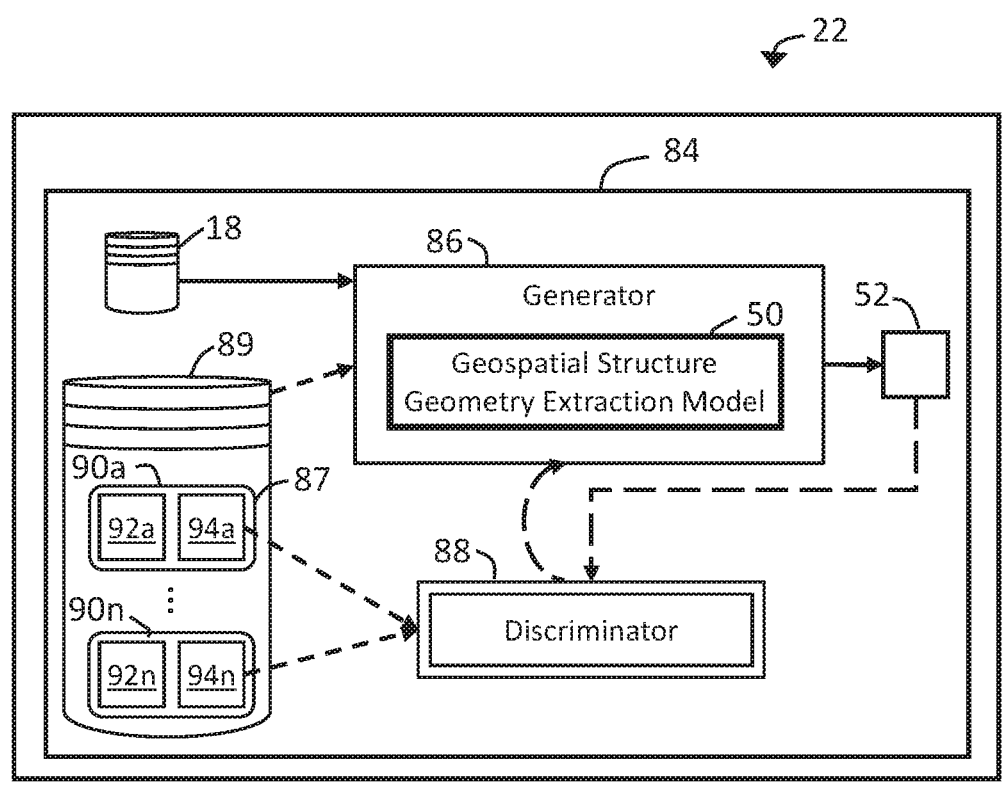
FIG. 4 is an exemplary embodiment of a generative adversarial network constructed in accordance with the present disclosure.

Referring now to FIG. 4, the feature mask generation module 22 may include a generative adversarial network 84 having a generator 86 and a discriminator 88. The generative adversarial network 84 is trained to analyze the images 38 and map a precise extent of one or more objects shown in the images 38, such as particular structures, for example, the structure 42. The fusion of the generative adversarial network 84 with high-resolution, geo-referenced aerial images (such as the images 38) enables clean extraction and measurement of the objects depicted in the image(s) 38, such as the structure 42. These objects may then be mapped in vector format, back to the ground, and used either alone as object masks and feature sets, or in combination with additional data sources for further analysis. In one embodiment, high-resolution imagery includes images with a resolution less than or equal to 6 inches per pixel but greater than zero inches per pixel. In other embodiments, high-resolution images include imagery with a resolution less than or equal to 3 inches per pixel but greater than zero inches per pixel.

The presently disclosed method may train the generative adversarial network 84 with training data 87, which may be stored in one or more database 89. The training data 87 includes a plurality of truth pairs 90a-n. Each of the truth pairs 90 includes a truth image 92 (which may be an RGB image) and a truth shape image 94 (which may also be an RGB image). Each of the truth pairs 90 are matched. The truth image 92a corresponds with the truth shape image 94a, and the truth image 92n corresponds with the truth shape image 94n.

When the generative adversarial network 84 is being trained to identify an object outline, the truth shape image 94 will include an outline of an object, for example, a building, within the truth image 92. For example, when the generative adversarial network 84 is trained to generate structure outlines, the truth shape image 94 may include a structure outline 96. The truth image 92 and the truth shape image 94 may have the same pixel resolution such that the pixels within the truth image 92 and the truth shape image 94 cover the same amount of area on the ground. In some embodiments, each of the pixels within the truth image 92 are within a range of approximately 0.1 inch to approximately 14 inches of ground coverage. Exemplary truth images 92 may have a pixel resolution of approximately 4 inches to approximately 10 inches. In some embodiments, each of the pixels within the truth shape image 94 are within a range of approximately 0.1 inch to approximately 14 inches of ground coverage. Exemplary truth shape images 94 may have a pixel resolution of approximately 4 inches to approximately 10 inches. In some embodiments, the truth image 92 and the truth shape image 94 will have the same pixel resolution.

Further, in some embodiments, the truth image 92 and the truth shape image 94 include metadata derived from the truth image 92, such as X, Y and Z information (e.g., latitude, longitude, and altitude); time; orientation such as pitch, roll, and yaw; camera parameters such as focal length and sensor size; and correction factors such as error due to calibrated focal length, sensor size, radial distortion, principal point offset, and alignment. In one embodiment, the metadata used to geo-reference the truth image 92 is the same as metadata used to geo-reference the truth shape image 94.

The generator 86 includes the geospatial structure geometry extraction model 50. The generator 86 may be in communication with the image database 18 and with the discriminator 88. Once trained, the geospatial structure geometry extraction model 50 processes images 38 stored within the image database 18 individually to generate the synthetic shape image 52 for at least one object within individual images 38.

In some implementations, the feature mask generation module 22 has been previously trained and the geospatial structure geometry extraction model 50 processes images 38 stored within the image database 18 individually to generate the synthetic shape image 52 for at least one object within individual images 38, without further training of the feature mask generation module 22.

In one embodiment, the synthetic shape image 52 is then applied to the particular image 38 processed by the feature mask generation module 22 to generate the mask image 38b'.

In some embodiments, the synthetic shape image 52 has metadata derived from the individual image 38 used to derive the synthetic shape image 52. For example, the image 38b shown in FIG. 3B is used to derive the example of the synthetic shape image 52 shown in FIG. 6. In this example, the synthetic shape image 52 may have a same pixel resolution as the image 38b. Further, the synthetic shape image 52 may have metadata, such as X, Y and Z information (e.g., latitude, longitude, and altitude); time; orientation such as pitch, roll, and yaw; camera parameters such as focal length and sensor size; and correction factors such as error due to calibrated focal length, sensor size, radial distortion, principal point offset, and alignment that is similar to or the same as the metadata for the image 38b. The metadata of the synthetic shape image 52 and the metadata of the image 38 may be used to align the synthetic shape image 52 with the image 38.

Figure 5:
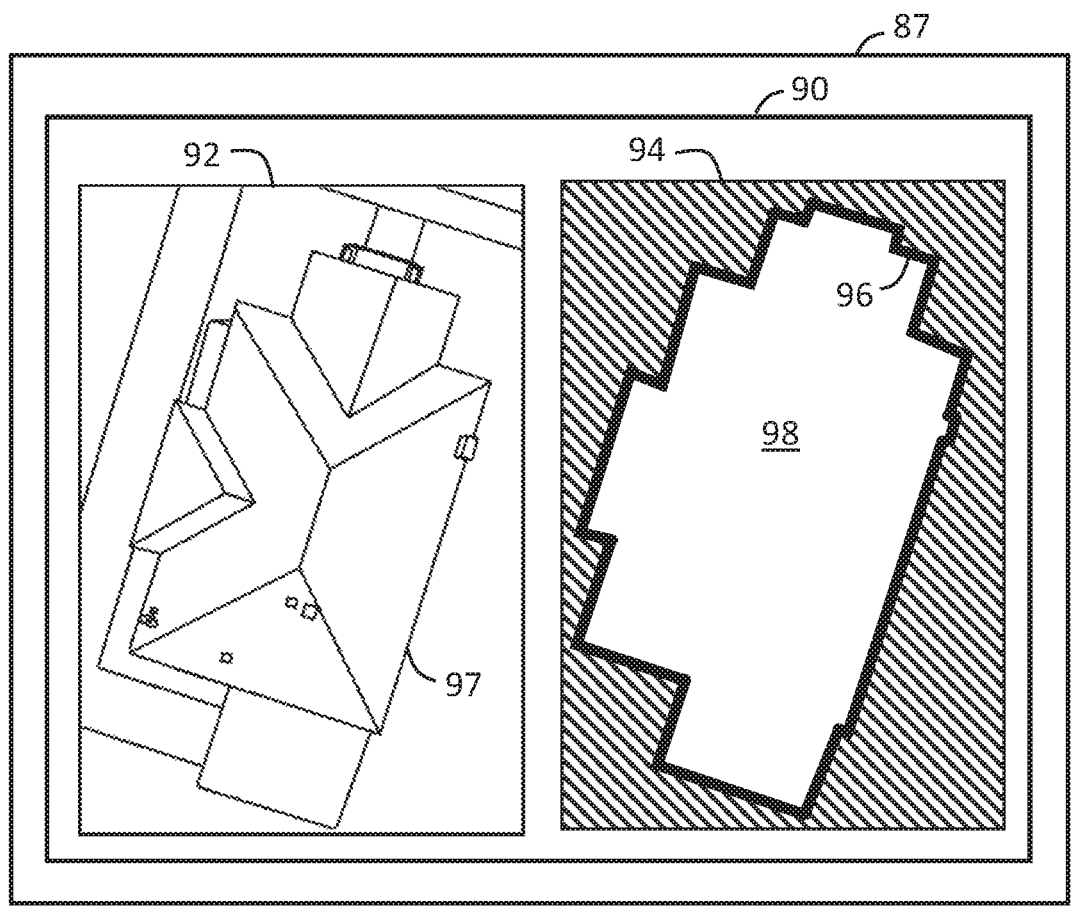
FIG. 5 is an exemplary embodiment of a truth pair used to train the generative adversarial network of FIG. 4.

The geospatial structure geometry extraction model 50 is a machine learning model that is trained using the training data 87. The training data 87, an exemplary embodiment of which is shown in FIG. 5, includes a plurality of truth pairs 90a-n, each having the truth image 92 and the truth shape image 94, and may be stored in the training database 89. The truth pairs 90 include images of a variety of objects, such as buildings. The truth images 92 may be ortho images, oblique images, or combinations thereof. The objects may include any type of man-made structure or building. Additionally, each of the one or more truth images 92 may be taken from a ground or an aerial perspective, or in some cases, may be taken from a satellite perspective. The truth image 92 includes pixels depicting an object, such as a structure 97.

For the truth image 92a-n of each truth pair 90a-n, the truth shape image 94a-n has been, or is, determined. The truth shape image 94a-n includes a truth shape 98, which may be the outline 96. The truth shape 98 may be a true and accurate outline 96 for the object(s) depicted within the truth images 92a-n. Defining the truth shape 98 within the truth shape images 94a-n may be done manually by an operator using an operator computer having image processing software. In this example, the operator would view the truth image 92 on a monitor, for example, and then add labels indicative of the truth shape 98 of an object (for example, a building) depicted within the truth image 92. The labels indicative of the truth shape 98, for example, the outline 96, can then be processed to form the truth shape image 94. The truth shape image 94 may be a binary image having pixel values within the truth shape 98 having a first value, and pixel values outside of the truth shape 98 having a second value. The truth shape image 94 may be a same pixel resolution as the truth image 92, as discussed above. In other embodiments, the truth shape image 94 has a different pixel resolution from the truth image 92, however, the truth shape image 94 may be able to map to the same resolution and/or metadata as the truth image 92, including the geo-referenced metadata such as longitude, latitude, and/or altitude.

The truth pairs 90a-n are used to train a neural network, such as the generative adversarial network 84, to generate the synthetic shape 99 (shown in FIG. 6 and described below). In order to train the generative adversarial network 84, the truth pairs 90a-n are provided to both the generator 86 and the discriminator 88. The generator 86 is trained by sequentially receiving the truth images 92a-92n.

In particular, for the first image pair 90a, the generator 86 receives the truth image 92a and generates the synthetic shape image 52 (FIG. 6). The synthetic shape image 52 includes a synthetic shape 99. The discriminator 88 receives the synthetic shape image 52 and then compares the synthetic shape 99 against the truth shape 98 within the truth shape image 94a (FIG. 5) which results in a probability of the synthetic shape 99 being the same as the truth shape 98 within a certain confidence amount for the first image pair 90a. The discriminator 88 then provides feedback to the generator 86 in an attempt to minimize any differences between the synthetic shape 99 and the truth shape 98. If the synthetic shape 99 is outside of the confidence amount, the generator 86 produces another synthetic shape image 52 having the synthetic shape 99 and passes the synthetic shape image 52 to the discriminator 88, and this process continues iteratively until the generator 86 produces the synthetic shape image 52 having the synthetic shape 99 to which the discriminator 88 rates as a sufficient probability of the synthetic shape 99 being the truth shape 98 for the first image pair 90*a*.

Then, the generator 86 and the discriminator 88 are provided with another truth pair 90, such as a truth pair 90*b*, and the process is repeated for truth pair 90*b*. This process preferably continues until the generator 86 and the discriminator 88 are trained with all of the truth pairs 90*a-n* within the database 89. At this point, the generator 86 is considered to be trained and the neural net model is set as the geospatial structure geometry extraction model 50. In this way, once the geospatial structure geometry extraction model 50 is trained and learns how to independently infer realistic synthetic shapes of objects not contained within the training data 87, the output of the geospatial structure geometry extraction model 50 results in a synthetic shape image 52 having the synthetic shape 99 in vector format that is geo-registered and mapped to the ground, that is the pixels within the synthetic shape image 52 are mapped to geospatial coordinates, yet is wholly unique but statistically consistent with the training data 87.

In one embodiment, the synthetic shape 99 may be a series of edges and nodes defining a wireframe outline of the structure 42, for example, while in other embodiments, the synthetic shape 99 is a region within the synthetic shape image 52 having an outer boundary corresponding to a size and shape of an outline 100 (see FIG. 3B) of the structure 42.

As discussed above, the truth pairs 90*a-n* are used to train a neural network, such as the generative adversarial network 84, to generate the synthetic shape image 52 having at least the synthetic shape 99. As shown in FIG. 4, the generative adversarial network 84 comprises two neural networks, each having a neural net model, the generator 86 and the discriminator 88. The generator 86 receives the image 38 and generates a synthetic shape image 52 having at least the synthetic shape 99 (FIG. 6). The discriminator 88, as a binary classifier, receives an input image and determines a probability that the input image is a "real" image, where the real image is a true and accurate truth image having a truth shape.

During the training process, the generator 86 and the discriminator 88 are trained in alternating steps. A first step may be passing a first truth shape image 94*a* as the input image to the discriminator 88, which then determines the probability that the first truth shape image 94*a* is a real truth shape image. Because it is known that the first truth shape image 94*a* is a truth shape image, the probability determined by a perfectly trained neural network should approach 1. Backpropagation is used to train the discriminator 88 such that the probability that the first truth shape image 94*a* is a real truth shape image more closely approaches 1. A second step may be passing a first truth image 92*a* to the generator 86, which then generates the synthetic shape image 52. The synthetic shape image 52 is then passed as the input image to the discriminator 88, which determines the probability that the synthetic shape image 52 is a real truth shape image.

Because an ideal generator will generate a synthetic image that the discriminator 88 determines is most probably a real truth shape image, the probability that the synthetic shape image 52 is a real truth shape image is backpropagated to the generator 86, thereby teaching the generator 86 how to improve the synthetic shape image 52 such that the synthetic shape image 52 is determined to be a real truth shape image. Through backpropagation to the generator 86, the difference between the synthetic shape image 52 and the first truth shape image 92*a* is minimized, thereby minimizing the difference between the synthetic shape 99 within the synthetic shape image 52 and the truth shape 98 within the truth shape image 94. The training process of alternating the steps of training the discriminator 88 and training the generator 86 continues until the neural net model reaches a Nash equilibrium, or a convergence, that is, until the output of the generator 86 is no longer affected by backpropagation from the discriminator 88.

Once the neural net model converges, the generator 86 is considered to be trained and the neural net model is set as the geospatial structure geometry extraction model 50. In this way, once the training process is complete, the geospatial structure geometry extraction model 50 has learned how to independently infer realistic synthetic shapes of objects not contained within the training data 87 that are wholly unique but statistically consistent with the training data 87. The output of the geospatial structure geometry extraction model 50 results in a synthetic shape image 52 having the synthetic shape 99 in vector format that is geo-registered and mapped to the ground, that is, the pixels within the synthetic shape image 52 are mapped to geospatial coordinates. In one embodiment, the synthetic shape 99 may be a series of edges and nodes defining a wireframe outline of the structure 42, for example, while in other embodiments, the synthetic shape 99 is a region within the synthetic shape image 52 having an outer boundary corresponding to a size and shape of an outline 100 (see FIG. 3B) of the structure 42.

In one embodiment, the truth shape images 94*a-n* of the training data 87 have metadata that is not present in, or is adjusted from the metadata in, the truth images 92*a-n*, such as one or more label, including texture and color, or structure features such as, but not limited to, porches, decks, carports, utility areas, or garages. A label includes supplemental information regarding the truth images 92*a-n*. The supplemental information identified in a label may be used during the training process. During the training process, the generative adversarial network 84 may further learn to generate metadata for the synthetic shape image 52. For instance, the generator 86 may learn to generate a synthetic texture label for the synthetic shape image 52 from training data 87 having a truth texture label within the metadata for the truth shape image 94.

Returning now to FIG. 6, shown therein is an exemplary embodiment of the synthetic shape image 52 having the synthetic shape 99 formed by the geospatial structure geometry extraction model 50. The synthetic shape image 52 is comprised of at least two components including a synthetic shape outline 104 surrounding the synthetic shape 99, and a synthetic shape area 108. The synthetic shape image 52 may also have a filler area 110 surrounding the synthetic shape area 108. The filler area 110 may be comprised of pixels having a common value or may be composed of pixels having randomized values. The synthetic shape outline 104 corresponds to the outline 100 of the structure 42 in the image 38*b*. The synthetic shape outline 104 may include structure 42 features such as the porches 60*a*, 60*b* and/or the garage 64. However, in other embodiments, the synthetic shape outline 104 does not include structure 42 features such as the porches 60*a*, 60*b* and/or the garage 64. For example, the synthetic shape outline 104 may include just a main living area of the structure. The synthetic shape area 108 is the area of one or more geometric figures defined by the synthetic shape outline 104. In one embodiment, the synthetic shape area 108 includes the feature extents of the structure 42 such as the porches 60a, 60b and/or the garage 64, while in another embodiment, the synthetic shape area 108 does not include such feature extents. As shown in FIG. 6, where the synthetic shape area 108 includes feature extents of the structure 42, such feature extents may be further identified by varied shading as indicated by a synthetic featureless shape area 108a—that is the synthetic shape area 108 less the areas of feature extents of the structure 42, such as, a synthetic first porch area 108b corresponding to the second porch 60b, a synthetic second porch area 108c corresponding to the first porch 60a, and a synthetic garage area 108d corresponding to the garage 64.

The synthetic shape 99 may then be used in further processing of the image 38b. For instance, the synthetic shape 99 may be used as a stand-alone geo-registered geometric outline of the structure 42. Additionally, the synthetic shape 99 may be used as a mask that may be applied to the image 38b in order to isolate the portion of the image 38 having pixels corresponding to the structure 42. Further, the synthetic shape 99 may be used to create a precise structure outline for obtaining measurements of the structure 42, for area extraction of the structure 42, or for defining the extent of the structure 42.

Figure 7:
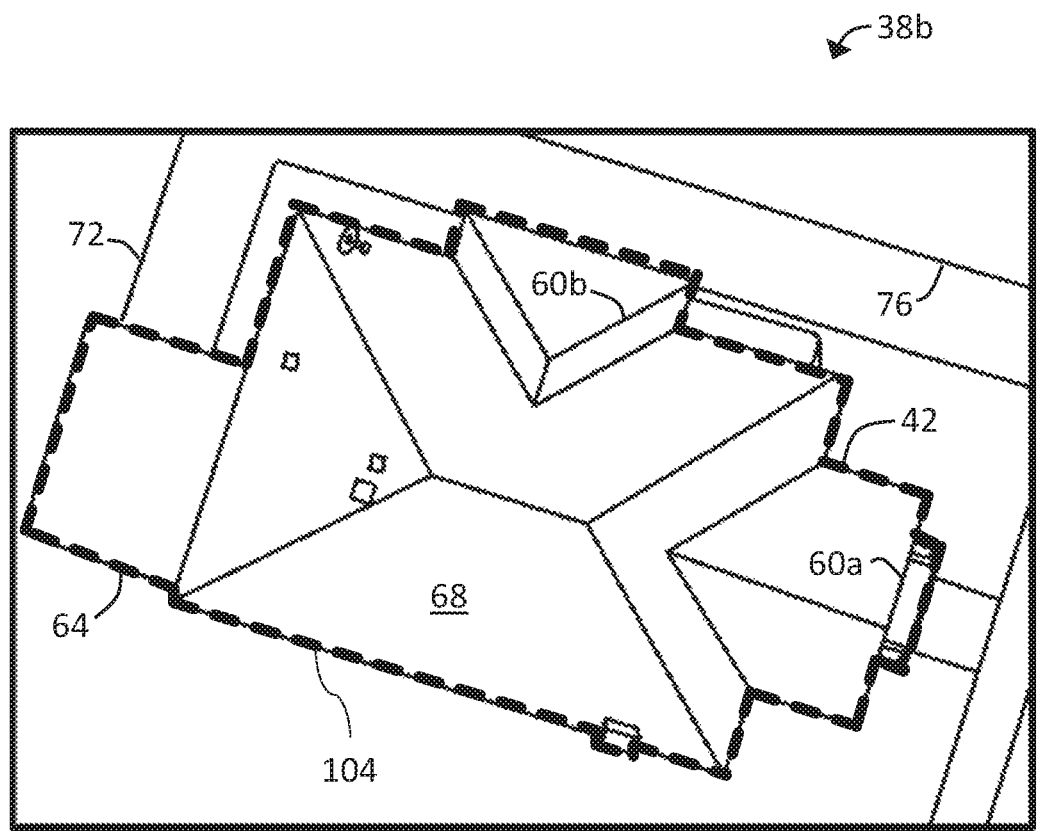
FIG. 7 is an exemplary depiction of the synthetic shape outline of FIG. 6 overlaid on the image of FIG. 3B.

In order to use the synthetic shape 99 as a mask applied to the image 38b, the synthetic shape outline 104 may first be aligned to the image 38. Referring now to FIG. 7, shown therein is an exemplary embodiment of the image 38b having the synthetic shape outline 104 aligned over the structure 42. Also shown are the first porch 60a, the second porch 60b, the garage 64, and the roof 68, within the synthetic shape outline 104. Background features, such as the driveway 72 and the road 76 within the image 38b are outside of the synthetic shape outline 104 and can be masked out of the image 38b. The synthetic shape outline 104 is mapped back onto the image 38b. Mapping the synthetic shape outline 104 onto the image 38b may be performed by aligning the image 38 and the synthetic shape outline 104 based on geolocation data stored and associated with both the image 38 and the synthetic shape outline 104. The driveway 72 and the road 76 are not included within the synthetic shape and, therefore, the synthetic shape outline 104 does not extend to surround the driveway 72 or the road 76.

Figure 8:
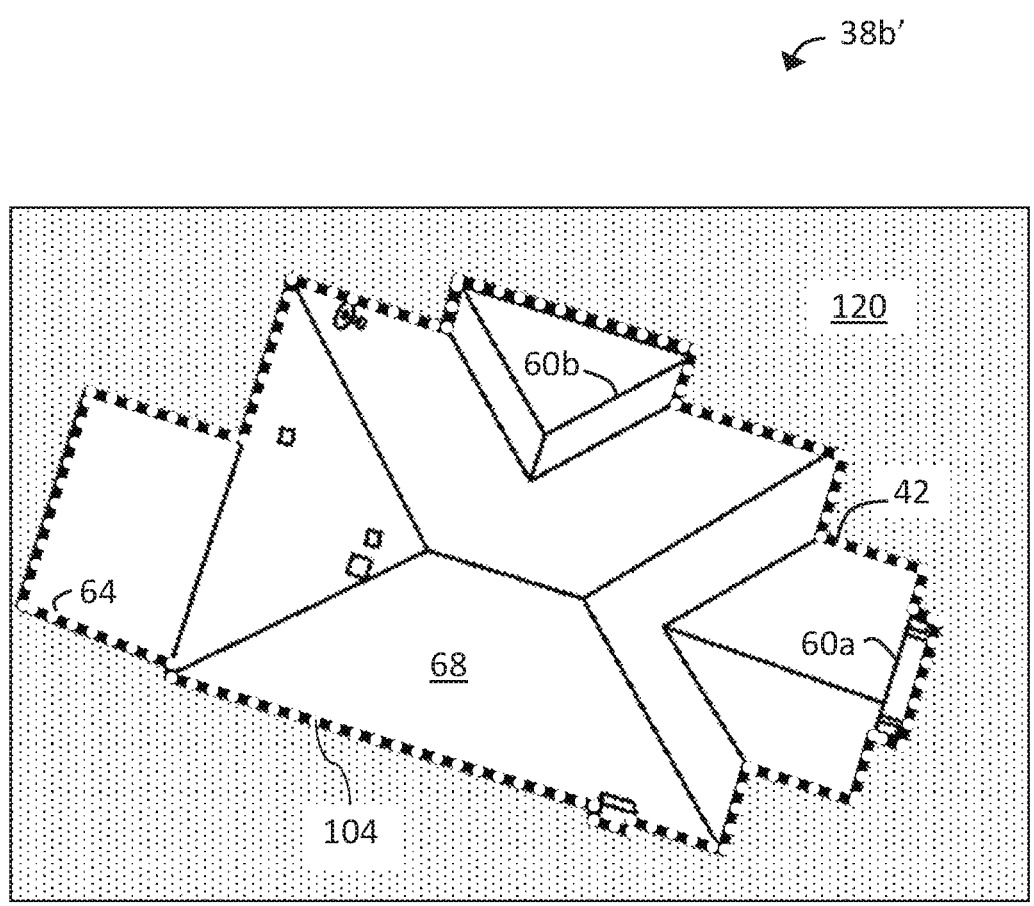
FIG. 8 is an exemplary embodiment of a mask image of FIG. 3B.

Referring now to FIG. 8, shown therein is an exemplary embodiment of the mask image 38b' wherein the synthetic shape outline 104 is applied as a feature mask thereby isolating the structure 42 within the image 38b. In creating the mask image 38b', the structure 42 in the image 38b is decoupled from an image background 120, the image background 120 being all the pixels of the image 38b outside of the synthetic shape outline 104 and correspond to the filler area 110 shown in FIG. 6. By altering all of the pixels of the image background 120 from the original pixel values of the image 38b to random or predetermined pixel values other than the original pixel values and maintaining the values of all pixels within the synthetic shape outline 104, the structure 42 may be the only identifiable object within the image 38b thereby forming the mask image 38b'. By utilizing the mask image 38b' for analyzing the structure 42, extraneous scene details are reduced, resulting in more optimal feature extraction and assessment of the structure 42 directly.

In one embodiment, when it is desired to form a featureless mask image showing only a featureless portion of the structure 42, a featureless shape outline may be formed around the featureless shape area 108a (FIG. 6), aligned and mapped onto the image 38b, and applied as a feature mask on image 38b forming mask image 38b', thereby isolating the portion of the structure 42 corresponding to the featureless shape area 108a by altering all pixels of the image from the original pixel values of the image 38b to random or predetermined pixel values other than the original pixel values while maintaining the values of all pixels within the featureless shape outline. The featureless mask image would thus be similar to the mask image 38b', however, the pixels within the mask image 38b' corresponding to the first porch 60a, the second porch 60b, and the garage 64 would be altered to random or predetermined pixel values other than their respective original pixel values.

Figure 9:
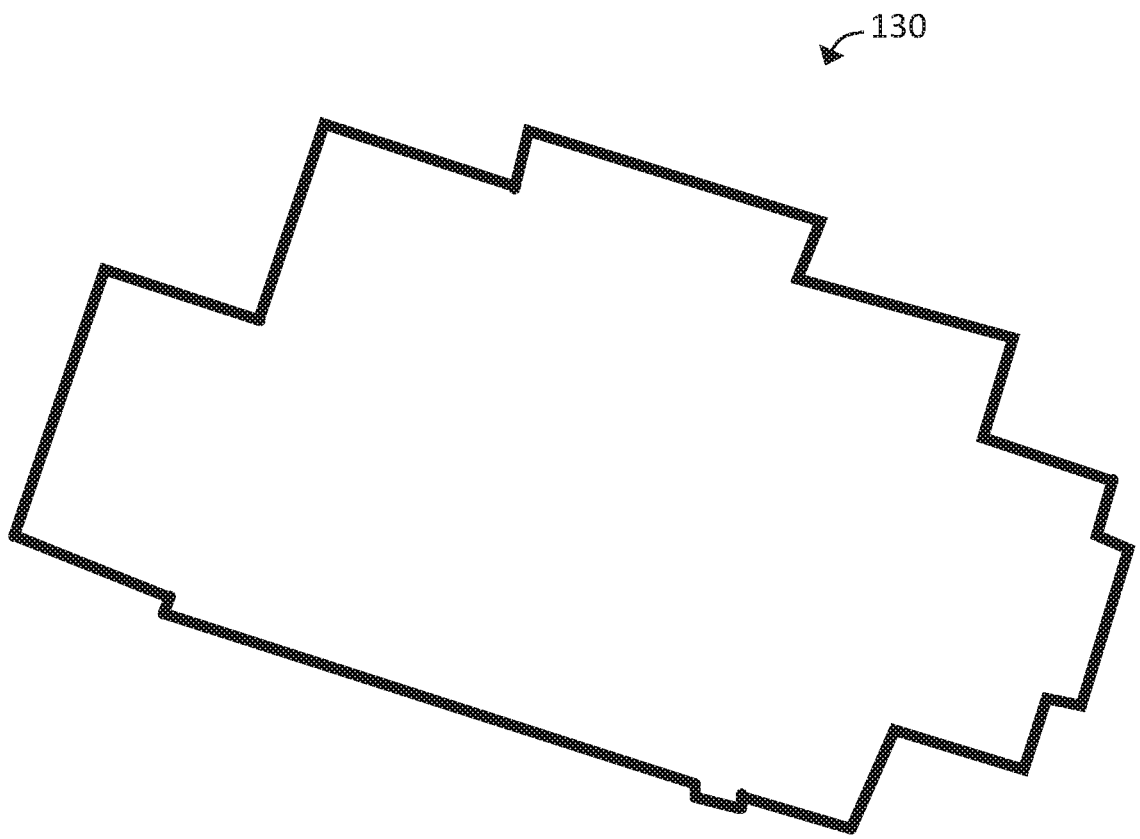
FIG. 9 is an exemplary embodiment of a precise structure outline created using the machine learning geospatial structure geometry extraction model in accordance with the present disclosure.

Referring now to FIG. 9, shown therein is an exemplary embodiment of a precise structure outline 130. The precise structure outline 130 may be formed by converting the synthetic shape outline 104 into a binary greyscale image. The pixels forming the synthetic shape outline 104 may be isolated, for example, by applying a morphological erosion algorithm followed by a dilation algorithm to remove any remaining noise, thereby extracting the precise structure outline 130 and its geospatial coordinates. A morphological erosion algorithm modifies the greyscale image of the synthetic shape outline 104 by shrinking the lighter regions of the grayscale image and enlarging darker regions. A dilation algorithm further modifies the greyscale image of the synthetic shape outline 104 by enlarging light regions and shrinking dark regions.

Figure 10:
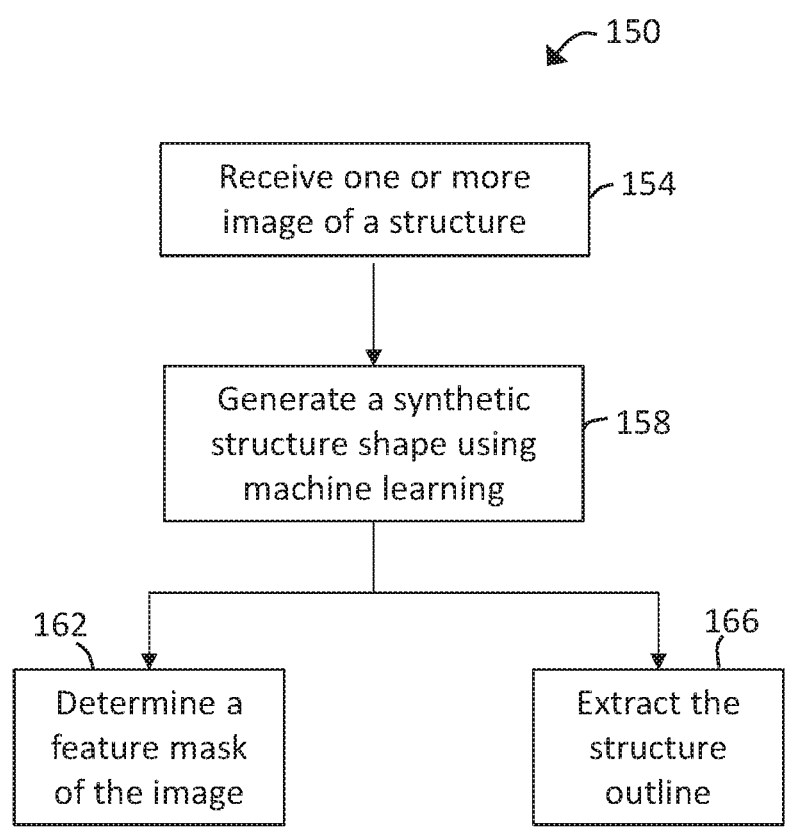
FIG. 10 is a process flow diagram of an exemplary embodiment of a geospatial structure geometry extraction method in accordance with the present disclosure.

Referring now to FIG. 10, shown therein is process flow diagram 150 of an exemplary embodiment of a geospatial structure geometry extraction method in accordance with the present disclosure. The geospatial structure geometry extraction method generally includes receiving and/or obtaining one or more image 38 of a structure 42 (step 154) and generating a synthetic shape 99 using machine learning (step 158). The synthetic shape 99 may then be used to determine a feature mask of the image 38 (step 162) and/or extract the precise structure outline 130 (step 166).

In some implementations, the feature mask may be applied to the image 38 to create the mask image 38'. In some implementations, the synthetic shape 99 may be used to generate the structure outline 130.

From the above description and examples, it is clear that the inventive concepts disclosed and claimed herein are well adapted to attain the advantages mentioned herein. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein. For exemplary purposes, examples of structures 42 and 46 of residential structures have been used. However, it is to be understood that the example is for illustrative purposes only and is not to be construed as limiting the scope of the invention.

The results of the geospatial structure geometry extraction system 10 may be used for a wide variety of real-world applications with respect to the structure 42. Non-exclusive examples of such applications include use of the results to determine a tax assessment, provide and/or complete inspections, to evaluate condition, to repair, to create underwriting, to insure, to purchase, to construct, or to value the structure 42.

It is to be understood that the steps disclosed herein may be performed simultaneously or in any desired order. For example, one or more of the steps disclosed herein may be omitted, one or more steps may be further divided in one or more sub-steps, and two or more steps or sub-steps may be combined in a single step, for example. Further, in some exemplary embodiments, one or more steps may be repeated one or more times, whether such repetition is carried out sequentially or interspersed by other steps or sub-steps. Additionally, one or more other steps or sub-steps may be carried out before, after, or between the steps disclosed herein, for example.

What is claimed is:

1. A non-transitory computer readable medium storing computer executable code that when executed by one or more computer processors causes the one or more computer processors to:

receive an image of a structure having an outline, the image having pixels with first pixel values depicting the structure and second pixel values outside of the structure depicting a background of a geographic area surrounding the structure, and image metadata including first geolocation data;

generate a synthetic shape image of the structure from the image using a machine learning algorithm, the synthetic shape image including pixels having pixel values forming a synthetic shape of the outline, the synthetic shape image having second geolocation data derived from the first geolocation data, wherein the synthetic shape of the outline is a vector outline of the structure;

map the vector outline onto the image of the structure, based at least in part on the first and second geolocation data; and change the second pixel values of the image so as to not depict the background of the geographic area surrounding the structure.

2. The non-transitory computer readable medium of claim 1, wherein the computer executable code that when executed by the one or more computer processors further causes the one or more computer processors to measure the vector outline of the structure from the image.

3. The non-transitory computer readable medium of claim 1, wherein the image has a pixel resolution less than 10 inches per pixel.

4. The non-transitory computer readable medium of claim 1, wherein the image has a pixel resolution between 10 inches per pixel and 0.1 inches per pixel.

5. The non-transitory computer readable medium of claim 1, wherein the machine learning algorithm is a first machine learning algorithm, and wherein the first machine learning algorithm is a component of a generator of a generative adversarial network, the generative adversarial network further comprising a discriminator having a second machine learning algorithm, the generator receiving the image of the structure and generating the synthetic shape image.

6. The non-transitory computer readable medium of claim 5, wherein the generative adversarial network has been trained with truth pairs with each truth pair including a truth image and a truth shape image.

7. The non-transitory computer readable medium of claim 6, wherein the truth image and the truth shape image have a same pixel resolution.

8. The non-transitory computer readable medium of claim 6, wherein the truth image includes third geolocation data and the truth shape image includes fourth geolocation data, the fourth geolocation data being derived from the third geolocation data.

9. The non-transitory computer readable medium of claim 1, wherein the image is a nadir image.

10. A method, comprising:

supplying a plurality of truth pairs to a first machine learning algorithm and a second machine learning algorithm, each of the truth pairs including a truth image and a truth shape image, the truth image having first pixel values depicting a structure and second pixel values depicting a background of a geographic area surrounding the structure, the structure having an outline, the truth shape image having third pixel values indicative of a truth shape indicating the outline of the structure, wherein the truth image and the truth shape image have a same pixel resolution;

generating a synthetic shape image of the structure from the truth image using the first machine learning algorithm, the synthetic shape image including pixels having fourth pixel values forming a synthetic shape of the outline of the structure;

passing the synthetic shape image of the structure from the first machine learning algorithm to the second machine learning algorithm;

comparing the synthetic shape against a truth shape from the truth shape image; and providing feedback from the second machine learning algorithm to the first machine learning algorithm to train the first machine learning algorithm to minimize any differences in the synthetic shape and the truth shape.

11. The method of claim 10, wherein the first machine learning algorithm is a component of a generator of a generative adversarial network, and the second machine learning algorithm is a component of a discriminator.

12. A method, comprising:

receiving, with one or more computer processors, an image of a structure having an outline, the image having pixels with first pixel values depicting the structure and second pixel values outside of the structure depicting a background of a geographic area surrounding the structure, and image metadata including first geolocation data;

generating a synthetic shape image of the structure from the image using a machine learning algorithm, the synthetic shape image including pixels having pixel values forming a synthetic shape of the outline, the synthetic shape image having second geolocation data derived from the first geolocation data, wherein the synthetic shape of the outline is a vector outline of the structure;

mapping, with the one or more computer processors, the vector outline onto the image of the structure, based at least in part on the first and second geolocation data; and changing the second pixel values of the image so as to not depict the background of the geographic area surrounding the structure.

13. The method of claim 12, further comprising measuring, with the one or more computer processors, the vector outline of the structure from the image.

14. The method of claim 12, wherein the image has a pixel resolution less than 10 inches per pixel.

15. The method of claim 12, wherein the machine learning algorithm is a first machine learning algorithm, and wherein the first machine learning algorithm is a component of a generator of a generative adversarial network, the generative adversarial network further comprising a discriminator having a second machine learning algorithm, the generator receiving the image of the structure and generating the synthetic shape image.

16. The method of claim 15, wherein the generative adversarial network has been trained with truth pairs with each truth pair including a truth image and a truth shape image.

17. The method of claim 16, wherein the truth image includes third geolocation data and the truth shape image includes fourth geolocation data, the fourth geolocation data being derived from the third geolocation data.

* * * * *